United States Patent
Jacobson

(10) Patent No.: US 12,024,110 B1
(45) Date of Patent: Jul. 2, 2024

(54) AIRBAG ASSEMBLY CHUTES

(71) Applicant: Autoliv ASP, Inc., Ogden, UT (US)

(72) Inventor: James Jacobson, Waterford, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 18/108,006

(22) Filed: Feb. 9, 2023

(51) Int. Cl.
  *B60R 21/201* (2011.01)
  *B60R 21/26* (2011.01)

(52) U.S. Cl.
  CPC ............ *B60R 21/201* (2013.01); *B60R 21/26* (2013.01)

(58) Field of Classification Search
  CPC .................................................. B60R 21/201
  See application file for complete search history.

(56) References Cited

U.S. PATENT DOCUMENTS

| | | | |
|---|---|---|---|
| 5,505,487 A * | 4/1996 | Brown | B60R 21/207 280/741 |
| 6,942,242 B2 * | 9/2005 | Hawthorn | B60R 21/16 280/743.1 |
| 7,770,922 B2 * | 8/2010 | Schneider | B60R 21/239 280/739 |
| 9,682,678 B2 * | 6/2017 | Rose | B60R 21/201 |
| 2003/0234520 A1 * | 12/2003 | Hawthorn | B60R 21/16 280/728.1 |
| 2010/0052298 A1 * | 3/2010 | Schneider | B60R 21/239 280/739 |
| 2010/0327565 A1 * | 12/2010 | Wagner | B60R 21/20 280/728.2 |
| 2017/0120853 A1 * | 5/2017 | Rose | B60R 21/201 |

* cited by examiner

*Primary Examiner* — Nicole T Verley
(74) *Attorney, Agent, or Firm* — Matthew D. Thayne; Thayne and Davis LLC

(57) ABSTRACT

Airbag cushion chutes and related assemblies comprising airbag cushion chutes for controlling airbag cushion deployment and/or protecting screens or other equipment in a vehicle. In some embodiments, an airbag cushion assembly may comprise a housing and an airbag cushion chute positioned within the housing. An inflatable cushion may be positioned within the airbag cushion chute, which airbag cushion chute may be configured to, upon deployment of the inflatable cushion, extend out of the housing to restrict expansion of the inflatable cushion in a lateral direction, which may allow for protecting, for example, a disassociated screen of a vehicle.

15 Claims, 5 Drawing Sheets

AIRBAG ASSEMBLY CHUTES

SUMMARY

Current vehicle designs often include a disassociated screen for displaying information and/or allowing the driver to operate various functions of the vehicle. Such screens are typically located in the center of the instrument panel. However, during deployment of an airbag cushion, the cushion may contact the screen, resulting in undesirable damage to the screen, to the cushion itself, and/or may otherwise result in unwanted redirection of the cushion trajectory.

The present inventors have therefore determined that it would be desirable to provide apparatus, systems and methods that overcome one or more of the foregoing limitations and/or other limitations of the prior art. In some embodiments, the inventive concepts disclosed herein may therefore allow for protecting a screen, or in other embodiments another sensitive object within a vehicle, by providing an airbag cushion chute from which the airbag cushion may deploy. The chute may be configured to restrict and/or redirect deployment to protect the screen or other object by preventing, or at least substantially preventing, contact between the cushion and the screen/object. In some embodiments, the chute may allow for contact but may provide protection by limiting/lowering contact forces and/or by providing a physical barrier between the cushion and the screen/object.

In a more particular example of a vehicle comprising an airbag assembly having an airbag cushion chute according to some embodiments, the vehicle may comprise a screen or one or more other objects in need of protection from an airbag cushion during deployment. The screen or other object(s) may project proximally towards a cabin of the vehicle with respect to a dashboard of the vehicle. The vehicle may further comprise an airbag cushion assembly configured to deploy from the dashboard, which may comprise an airbag cushion chute and an inflatable cushion positioned within the airbag cushion chute. The airbag cushion chute may be configured to, upon deployment of the inflatable cushion, extend out beyond the dashboard adjacent to the screen and/or other objects to at least one of protect the screen/object(s) during deployment and control deployment of the inflatable cushion to at least inhibit deployment of the inflatable cushion in a direction towards the screen/object(s).

In some embodiments, the inflatable cushion assembly may comprise a passenger airbag assembly and the dashboard may comprise a passenger dashboard.

In some embodiments, the airbag cushion chute may comprise a fabric material. In some such embodiments, the airbag cushion chute may comprise the same fabric material that makes up the inflatable cushion.

In some embodiments, the airbag cushion chute may be configured to extend beyond a distance from which the screen or other object(s) projects from the dashboard.

In some embodiments, the airbag cushion chute may be configured to contact the screen/object(s) during deployment. Alternatively, the airbag cushion chute may be configured to avoid, or at least substantially avoid, contacting the screen/object(s) during deployment.

In some embodiments, the airbag cushion chute may be configured to direct deployment of the inflatable cushion to prevent both the airbag cushion chute and the inflatable cushion from contacting the screen during deployment.

In an example of an airbag cushion assembly according to some embodiments, the assembly may comprise a housing and an airbag cushion chute positioned within the housing. The assembly may further comprise an inflatable cushion positioned within the airbag cushion chute, wherein the airbag cushion chute is configured to, upon deployment of the inflatable cushion, extend out of the housing to restrict expansion of the inflatable cushion in a lateral direction. In some such embodiments, the airbag cushion chute may be configured to, upon deployment of the inflatable cushion, extend out of the housing to restrict expansion of the inflatable cushion in all lateral directions perpendicular to a primary deployment direction of the inflatable cushion.

In some embodiments, the airbag cushion chute may comprise an outer peripheral edge that extends continuously about a full perimeter of the airbag cushion chute to at substantially define a fully enclosed chute.

In some embodiments, the airbag cushion chute may comprise a fabric material, in some cases the same fabric material defining the inflatable cushion.

In some embodiments, the airbag cushion chute may comprise a single length defined between a base of the airbag cushion chute and an outer peripheral edge of the airbag cushion chute in a deployed configuration. In other words, all sides of the airbag cushion chute may have the same, or at least substantially the same, length/height.

In some embodiments, the airbag cushion chute may be constructed, in some cases wholly constructed, from a flat panel. In some such embodiments, and implementations of related methods, the airbag cushion chute may be constructed from a flat panel having four coupled edges each defined by coupling opposing edges of the flat panel together between a fixed corner of the flat panel and respective opposing corners of the flat panel, which opposing corners may become a single, fixed corner by sewing or otherwise coupling the aforementioned opposing edges of the flat panel.

In some embodiments, the airbag cushion chute may comprise a length, in a deployed configuration of the airbag cushion chute, that is greater than a height of the housing. In some such embodiments, the airbag cushion chute may comprise a length that is at least twice the height of the housing.

In another example of an airbag cushion assembly according to some embodiments, the assembly may comprise a housing and an airbag cushion chute positioned within the housing. The airbag cushion chute may comprise a fabric material and may further comprise a closed bottom end and an open top end, which open top end may be configured to be wrapped and/or folded to enclose an inflatable cushion therein and to define a top, prior to deployment, of the chute. The assembly may further comprise an inflatable cushion positioned within the airbag cushion chute, which airbag cushion chute may be configured to, upon deployment of the inflatable cushion, extend out of the housing to restrict expansion of the inflatable cushion in a lateral direction, which may be a direction corresponding with a location of a screen or other fixed object to be protected in a vehicle. The airbag cushion chute may be configured to define a tunnel for deployment of the inflatable cushion that at least substantially lacks any loose flaps.

In some embodiments, the tunnel may wholly lack any loose flaps.

In some embodiments, the airbag cushion chute may be manufactured from a flat panel having four respective opposing edges of the flat panel sewn together to define an open-ended cuboid shape.

In some embodiments, the airbag cushion chute may comprise a length, which may be defined along a deployment direction of the airbag cushion chute and/or cushion, that, in a deployed configuration of the airbag cushion chute, is greater than a height of the housing. In some such embodiments, the length of the airbag cushion chute may be at least twice the height of the housing.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

As used herein, the term "substantially" refers to the complete or nearly complete extent or degree of an action, characteristic, property, state, structure, item, or result to function as indicated. For example, an object that is "substantially" cylindrical or "substantially" perpendicular would mean that the object/feature is either cylindrical/perpendicular or nearly cylindrical/perpendicular so as to result in the same or nearly the same function. The exact allowable degree of deviation provided by this term may depend on the specific context. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

Similarly, as used herein, the term "about" is used to provide flexibility to a numerical range endpoint by providing that a given value may be "a little above" or "a little below" the endpoint while still accomplishing the function associated with the range.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1:
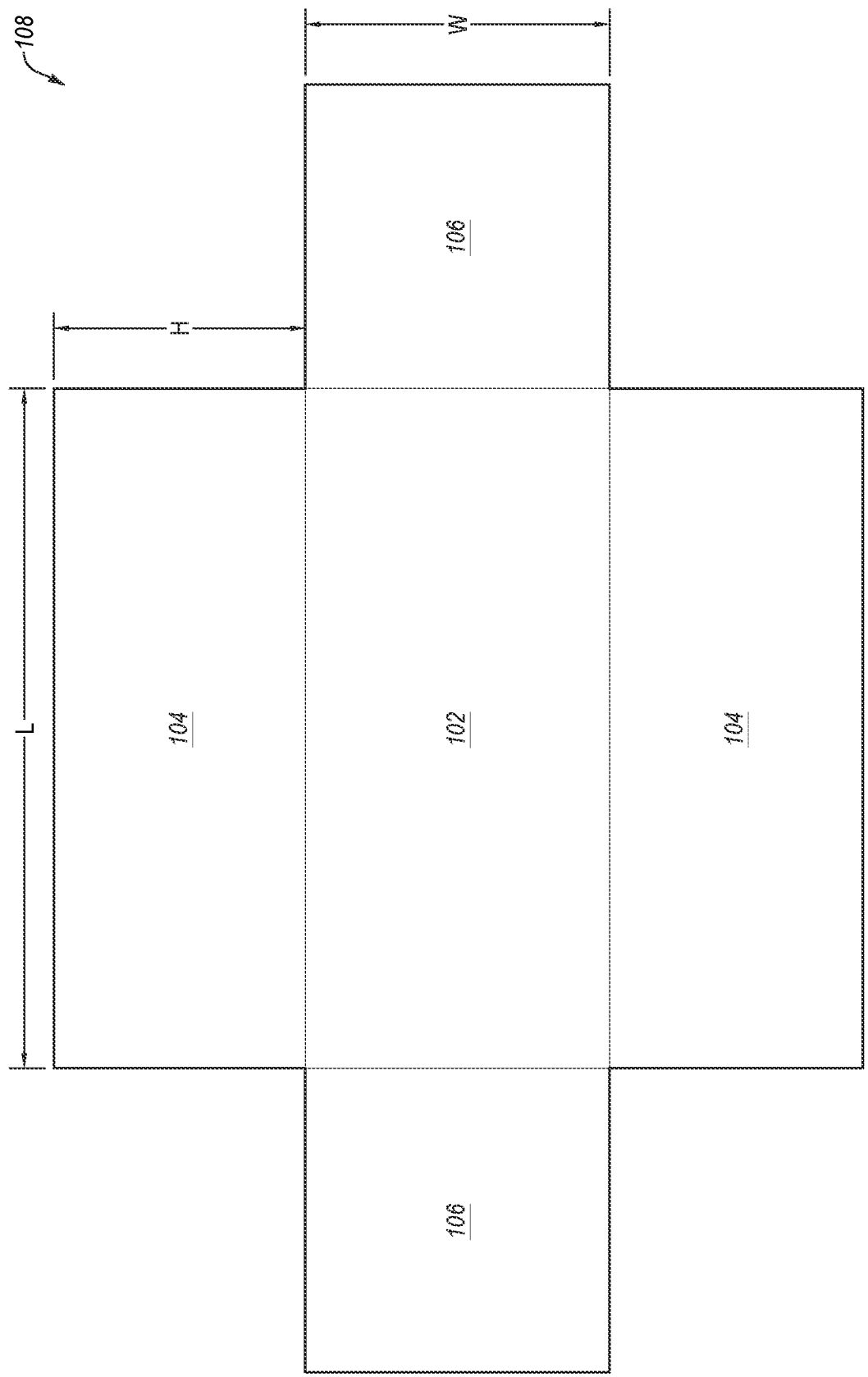
FIG. 1 depicts a flat panel configured to be manufactured into an airbag chute according to some embodiments.

FIG. 1 depicts a flat panel 108 configured for use in manufacturing an airbag cushion chute according to some embodiments. As shown in FIG. 1, panel 108 comprises a base portion 102, two opposing side portions/flaps 104 having a length distance L and a height distance H, and two opposing end portions/flaps 106 having a width distance W (and also preferably having the same height distance H and the side portions 104). Base portion 102 will form a base for a chute that may, as described below, be used to guide deployment of an airbag cushion so as to avoid contact with a sensitive object affixed in the vehicle cabin, such as a disassociated touchscreen or the like, which are commonly used in modern vehicles. In some embodiments, the chute may provide protection to the sensitive object by reducing the force of the contact with an airbag cushion and/or may provide protection by providing a protective intervening structure to, for example, cushion the impact or otherwise reduce the potentially damaging forces to the object, the cushion, or both. As also discussed in greater detail below, the distance H is preferably configured to allow the resulting chute to both extend out of an airbag housing and preferably extend further than the screen or other object projects inwardly within the vehicle cabin relative to the proximal exit point of the housing. In some embodiments, the distance H of the airbag cushion chute is at least twice the corresponding height of the airbag housing within which it is positioned.

Figure 2A:
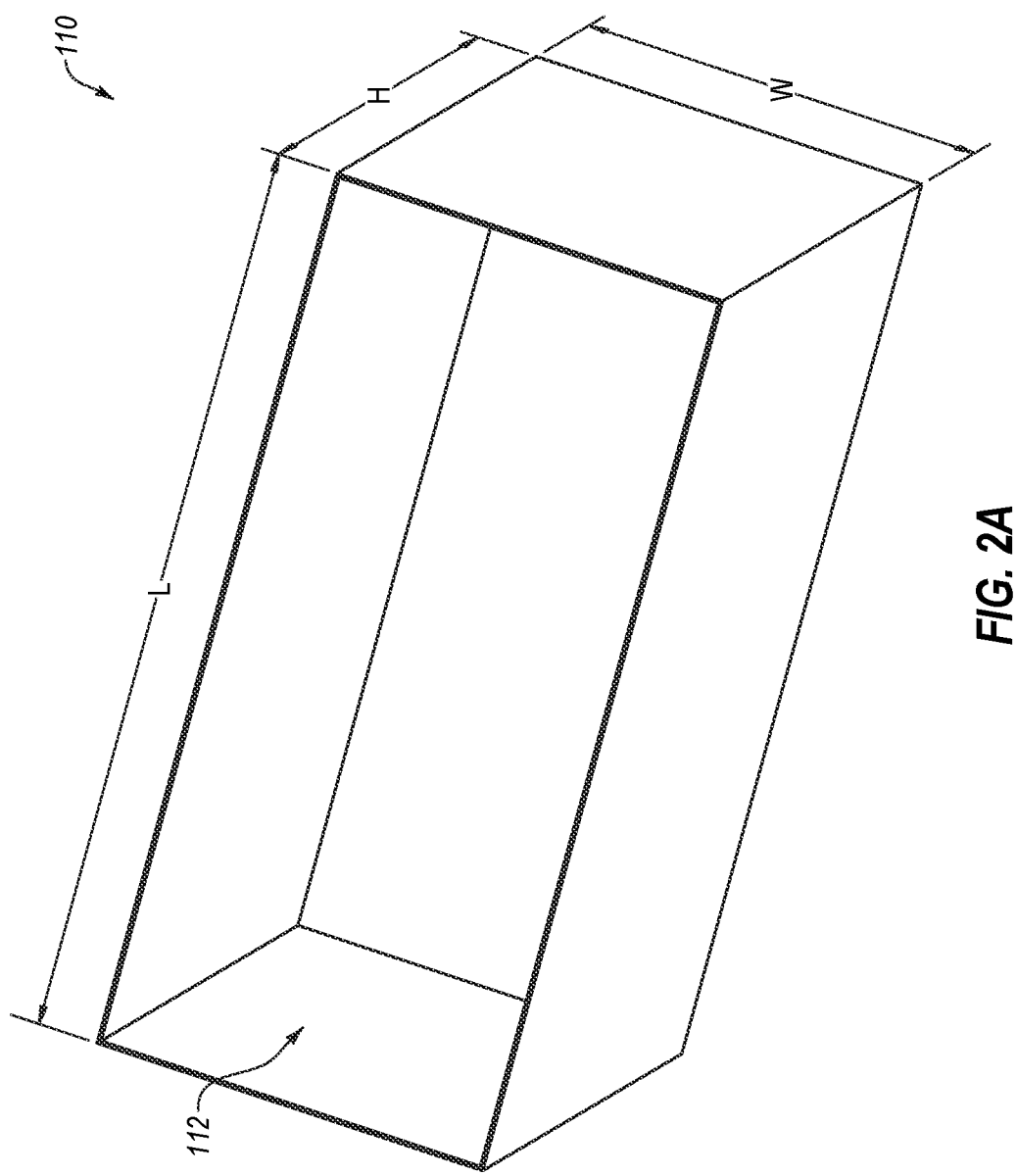
FIG. 2A depicts an open airbag chute according to some embodiments.

FIG. 2A depicts an airbag cushion chute 110 that may be formed from the panel 108 of FIG. 1. As shown in this figure, chute 110 defines a compartment 112 that is configured to receive a folded or otherwise compressed airbag cushion (not shown) therein and for deployment therefrom. As also shown in this figure, the height H of this compartment is preferably not only sufficient to extend to the full depth/height of the corresponding airbag cover (also not shown) within which it is to be positioned, but also to extend above the periphery of the airbag cover so as to guide and direct airbag expansion, preferably in a manner that avoids, or at least substantially avoids, contact with one or more sensitive objects in a vehicle cabin, such as a screen that may be used to control various features of the vehicle. In preferred embodiments, this distance H is sufficient to both extend out of the housing and to extend further than the screen or other sensitive object(s). However, it is contemplated that, in some embodiments, the chute 110 may control deployment to avoid, or at least substantially avoid, this contact while only partially extending out of the cover and not fully extending to or past the adjacent object(s). It should also be understood that some embodiments may allow for chute contact with the sensitive object(s) but the chute may be configured to provide sufficient protection to the object(s) by, for example, decreasing the deployment forces against the object(s) and/or providing an intervening protective barrier to prevent or at least reduce the probability of damage to the object(s) and/or cushion.

In order to manufacture chute 110 from flat panel 108, preferably each of the edges are formed by sewing or otherwise coupling together the adjacent flaps/portions of the flat panel 108. Thus, the opposing edges of end portions 106 may, respectively, be sewn together or otherwise coupled together with the adjacent edges of side portions 104. Preferably, this is done in a manner such that the resulting chute 110 defines an opening at the end opposite base portion 102 that is both open and defines a tunnel for deployment of an inflatable cushion that at least substantially lacks any loose flaps. More preferably, the resulting chute 110 defines an opening at the end opposite base portion 102 that is both open and defines a tunnel for deployment of an inflatable cushion that wholly lacks any loose flaps.

In some embodiments, chute 110 and/or flat panel 108 may comprise the same material, or a similar material as the airbag cushion contained therein. Thus, the chute 110 may comprise a fabric material. However, other materials may be used in alternative embodiments, such as materials that are stiffer, thicker, stronger, and/or configured to provide added protection and/or provide greater deployment-altering forces to the airbag cushion contained therein.

Preferably, the proximal edge of the chute 110 in this configuration, which corresponds with the shape of the chute 110 during deployment after the cushion has exited the housing, defines, or at least substantially defines, a smooth edge lacking, or at least substantially lacking, in any regions in which the edge extends into an adjacent plane into opposing, adjacent, loose edges that may define "flaps" similar to the flaps of the flat panel 108. Stated otherwise, the outer/proximal peripheral edge of chute 110 preferably extends continuously about a full perimeter of the chute 110 to define, or at substantially define, a fully enclosed chute for deployment of an airbag cushion therefrom.

Figure 2B:
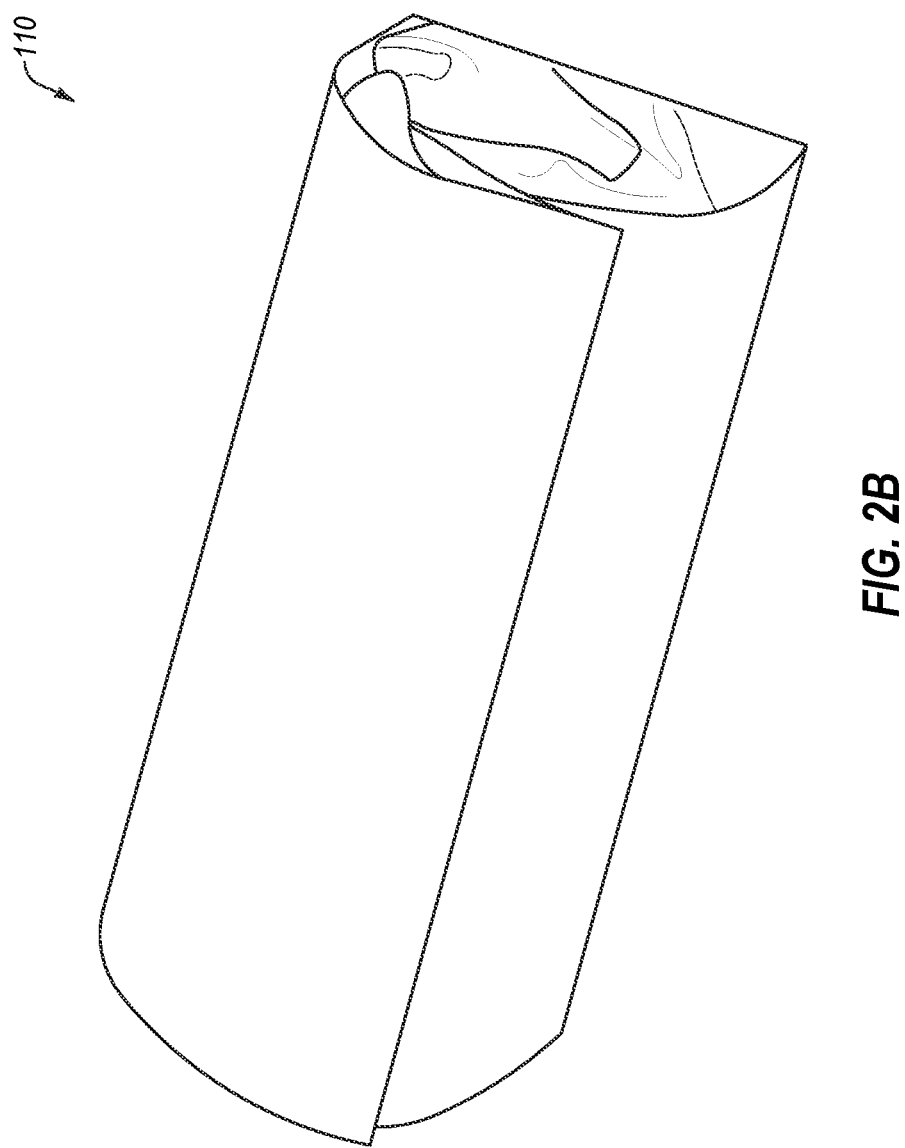
FIG. 2B depicts the airbag chute of FIG. 2A after an airbag cushion has been positioned therein and the chute folded for positioning in an airbag cover.

FIG. 2B depicts chute 110 after a folded or otherwise compressed airbag cushion (not shown) has been positioned therein. As shown in this figure, the top of the chute 110 is preferably folded down to enclose the airbag cushion therein. This may be accomplished in any suitable manner, such as by folding each side down in any suitable sequence, preferably to provide a closed upper portion or lid to the chute 110.

Figure 3A:
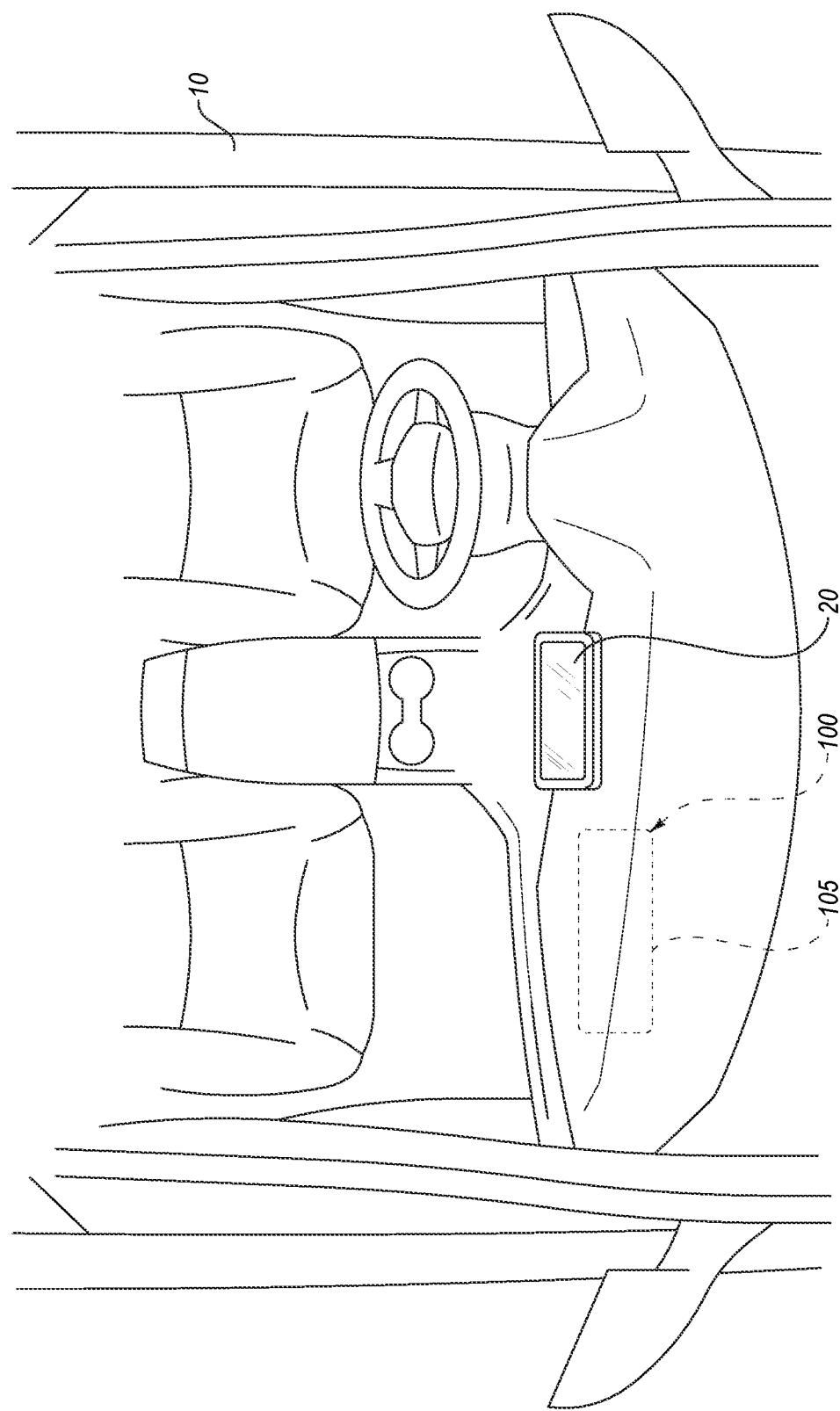
FIG. 3A depicts an airbag assembly in a vehicle comprising an airbag chute to protect an adjacent screen of the vehicle according to some embodiments shown prior to deployment.

FIG. 3A depicts the interior of a vehicle 10 having a disassociated screen 20 positioned in a cabin of the vehicle in the region between the driver and passenger sides of the vehicle 10. Vehicle 10 further comprises a passenger airbag assembly 100 comprising an airbag housing 105 from which an airbag cushion 114 is configured to deploy (see FIG. 3B).

Figure 3B:
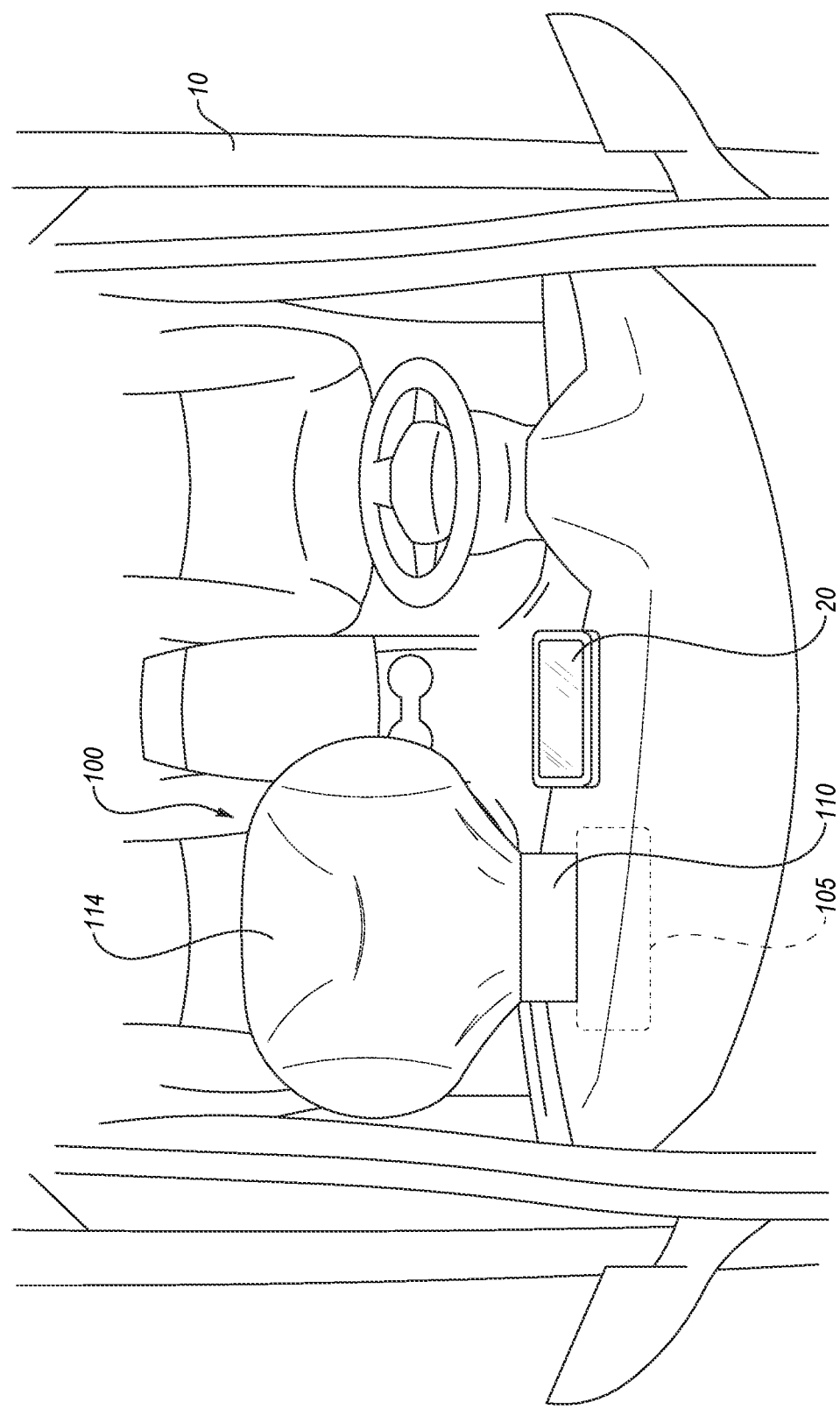
FIG. 3B depicts the airbag assembly of FIG. 3A following deployment.

FIG. 3B depicts vehicle 10 during deployment of airbag cushion 114. As shown in this figure, deployment of cushion 114 has unfolded chute 110 and caused chute 110 to project out of housing 105. As mentioned above and as shown in FIG. 3B, in the preferred embodiment depicted in this figure, chute 110 is configured with a sufficient length such that it protrudes beyond the distance with which screen 20, or another sensitive item in the vehicle cabin, protrudes so as to provide protection to the screen 20 and/or the cushion 114 during deployment. Again, however, this protection may be provided without projecting the chute 110 this far by, for example, directing the deployment of cushion 114 in a manner that restricts expansion in the cross-car direction of the screen 20. This may be accomplished, for example, but providing chute 110 with a relatively stiff/strong material rather than relying on its length.

FIG. 3B further illustrates that the airbag cushion chute 110 is configured to, upon deployment of the airbag cushion 114, extend out of the housing 105 to restrict expansion of the cushion 114 in lateral directions perpendicular to a primary deployment direction of airbag cushion 114, which is directed towards the passenger and/or passenger seat of vehicle 10. In the depicted embodiment, the chute 110 is configured to extend out of the housing 105 to restrict expansion of the inflatable cushion 114 in all lateral directions perpendicular to this primary deployment direction of the airbag cushion 114. However, it is contemplated that, in some alternative embodiments, the chute may instead be configured to restrict expansion of the cushion primarily only in a direction of a screen in the vehicle or one or more other objects in need of protection.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. An airbag cushion assembly, comprising:
   a housing;
   an airbag cushion chute positioned within the housing; and
   an inflatable cushion positioned within the airbag cushion chute, wherein the airbag cushion chute is configured to, upon deployment of the inflatable cushion, extend out of the housing to restrict expansion of the inflatable cushion in a lateral direction, and wherein the airbag cushion chute is configured to expand out of the housing by unfolding.

2. The airbag cushion assembly of claim 1, wherein the airbag cushion chute is configured to, upon deployment of the inflatable cushion, extend out of the housing to restrict expansion of the inflatable cushion in all lateral directions perpendicular to a primary deployment direction of the inflatable cushion.

3. The airbag cushion assembly of claim 1, wherein the airbag cushion chute comprises an outer peripheral edge that extends continuously about a full perimeter of the airbag cushion chute to at substantially define a fully enclosed chute.

4. The airbag cushion assembly of claim 1, wherein the airbag cushion chute comprises a fabric material.

5. The airbag cushion assembly of claim 4, wherein the fabric material of the airbag cushion chute comprises a fabric material also defining the inflatable cushion.

6. The airbag cushion assembly of claim 1, wherein the airbag cushion chute comprises a single length defined between a base of the airbag cushion chute and an outer peripheral edge of the airbag cushion chute in a deployed configuration.

7. The airbag cushion assembly of claim 1, wherein the airbag cushion chute is constructed from a flat panel.

8. The airbag cushion assembly of claim 7, wherein the airbag cushion chute is constructed from a flat panel having four coupled edges each defined by coupling opposing edges of the flat panel together between a fixed corner of the flat panel and respective opposing corners of the flat panel.

9. The airbag cushion assembly of claim 1, wherein the airbag cushion chute comprises a length, in a deployed configuration of the airbag cushion chute, that is greater than a height of the housing.

10. The airbag cushion assembly of claim 1, wherein the airbag cushion chute defines a tunnel.

11. The airbag cushion assembly of claim 10, wherein the tunnel lacks any loose flaps.

12. The airbag cushion assembly of claim 1, wherein the airbag cushion chute comprises a length, in a deployed configuration of the airbag cushion chute, that is at least twice as long as a height of the housing measured along a deployment direction of the inflatable cushion.

13. The airbag cushion assembly of claim 1, wherein the airbag cushion chute is configured to project out of the housing during deployment and restrict expansion in a direction perpendicular to a primary deployment direction to reduce a possibility of contacting elements laterally adjacent to the airbag cushion assembly within a vehicle.

14. The airbag cushion assembly of claim 1, wherein the lateral direction is perpendicular to a primary direction of deployment of the inflatable cushion.

15. An airbag cushion assembly, comprising:
a housing;
an airbag cushion chute positioned within the housing; and
an inflatable cushion positioned within the airbag cushion chute, wherein the airbag cushion chute is configured to, upon deployment of the inflatable cushion, extend out of the housing to restrict expansion of the inflatable cushion in a lateral direction, and wherein the airbag cushion chute is configured to, upon deployment of the inflatable cushion, extend out of the housing to restrict expansion of the inflatable cushion in all lateral directions perpendicular to a primary deployment direction of the inflatable cushion.

\* \* \* \* \*